D. E. TEAL.
Improvement in Tilting-Chairs.
No. 5,054. Reissued Sep. 10, 1872.
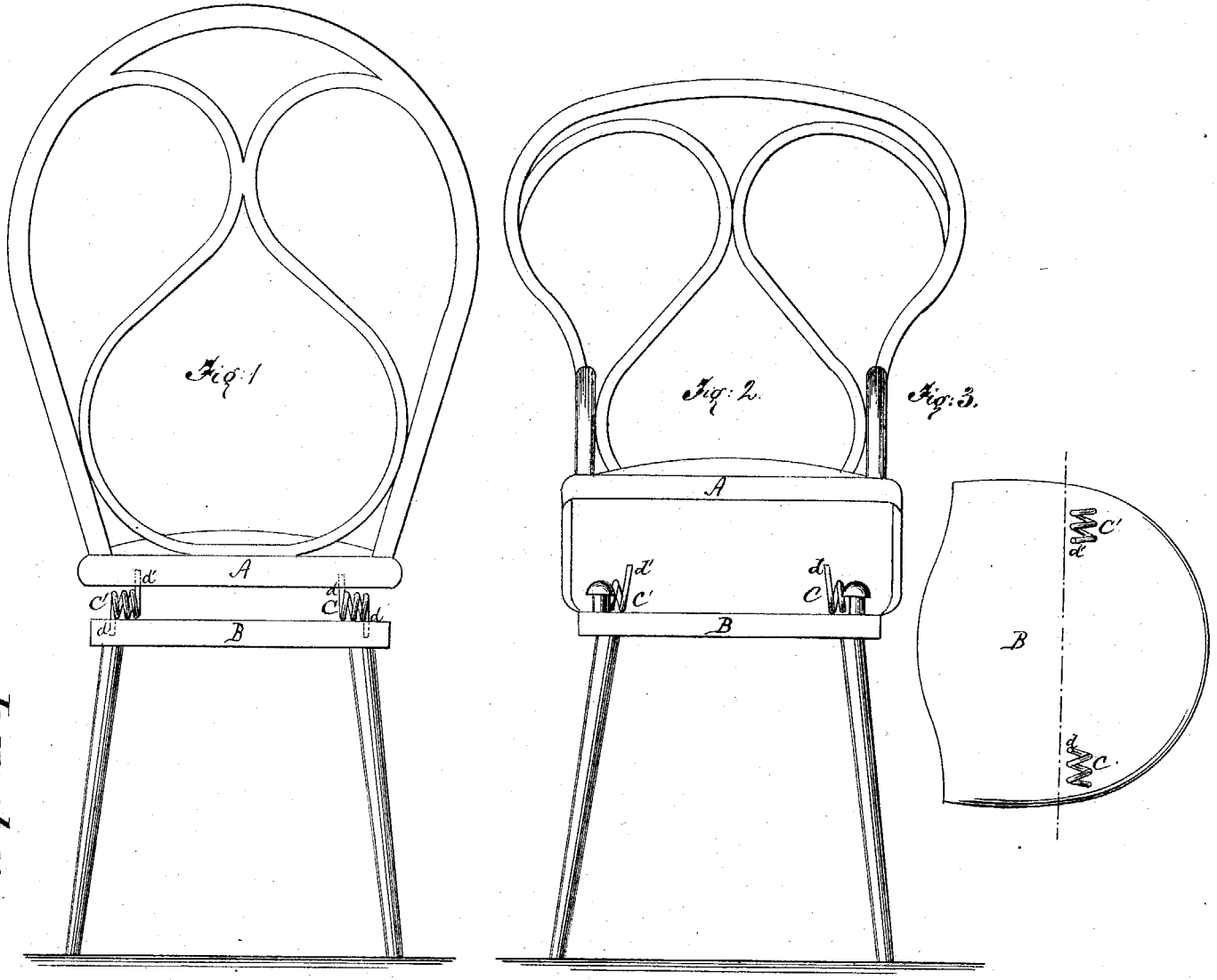
Witnesses:
H. C. Wattenberg
W. Woodell
Inventor:
Daniel E. Teal
per G. M. Hopkins
Atty
AM. PHOTO-LITHOGRAPHIC CO. N.Y. (OSBORNE'S PROCESS.)

UNITED STATES PATENT OFFICE.

DANIEL E. TEAL, OF NEW LISBON, NEW YORK, ASSIGNOR TO HEYWOOD BROTHERS & COMPANY.

IMPROVEMENT IN TILTING-CHAIRS.

Specification forming part of Letters Patent No. 38,428, dated May 5, 1863; reissue No. 5,054, dated September 10, 1872.

*To all whom it may concern:*

Be it known that I, DANIEL E. TEAL, of New Lisbon, in the county of Otsego and State of New York, have invented a new and useful Improvement in Chairs; and I do hereby declare that the following is a full and exact description thereof, reference being had to the accompanying drawing and to the letters of reference marked thereon, in which—

Figure 1 is a rear view of the chair in its upright position, showing the arrangement of the spring beneath the posterior part of the seat; and Fig. 2 is a front view of the chair in its leaning or recumbent position. Fig. 3 is a plan view of my invention, showing position of springs.

Like characters denote corresponding parts in the several figures.

The nature of my invention consists in constructing a chair for ordinary uses in an upright position, but suited to meet a universal want in its adaptability to tilt backward, when desired, without having its front legs raised or any strain thrown upon its hinder legs, thus preventing all injury to the chair as well as to the person seated upon it in his attempt to assume a recumbent attitude.

To enable others skilled in the art to make and use my invention, I will proceed to describe its construction and operation.

A is the superior part of the chair, or chair proper, differing in no essential particular from chairs in common use. B is the inferior or lower part of the chair, combining the seat-frame, legs, and braces of an ordinary chair. C C′ are coil-springs, each having its points of attachment to the frame B and seat A at *d d′ d d′*, in the rear of a line drawn transversely through the center of the seat of the chair.

Springs of other kinds may be used, with various modifications of arrangement, to produce the same result, in accordance with the nature of this invention.

I am aware that chairs have been made, for the uses of dentists and barbers, with appliances for elevating and depressing the head of the patient or sitter by means of ratchets, set-pins, screws, and other suitable devices; and I am also aware that rocking-chairs are adapted to such movements without changing the position of the chair-legs in relation to the rockers beneath them. These I do not claim; but What I do claim as new, and desire to secure by Letters Patent, is—

A tilting-chair having interposing springs secured between the seat and the frame wholly in the rear of a line drawn transversely through the center of the seat.

Witnesses: DANIEL E. TEAL.
H. L. WATTENBERG,
G. M. PLYMPTON.